(12) United States Patent
Kwon et al.

(10) Patent No.: US 11,514,560 B2
(45) Date of Patent: Nov. 29, 2022

(54) METHOD OF CORRECTING IMAGE LATENCY AND APPARATUS USING THE SAME

(71) Applicant: SAMSUNG ELECTRONICS CO., LTD., Suwon-si (KR)

(72) Inventors: Namseop Kwon, Suwon-si (KR); Myungjae Jeon, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/350,541

(22) Filed: Jun. 17, 2021

(65) Prior Publication Data

US 2022/0215515 A1 Jul. 7, 2022

(30) Foreign Application Priority Data

Dec. 28, 2020 (KR) .......................... 10-2020-0185211

(51) Int. Cl.
| G06T 5/00 | (2006.01) |
| G09G 5/37 | (2006.01) |
| G06T 7/73 | (2017.01) |

(52) U.S. Cl.
CPC ............... *G06T 5/006* (2013.01); *G06T 7/73* (2017.01); *G09G 5/37* (2013.01); *G09G 2340/14* (2013.01)

(58) Field of Classification Search
CPC .............. G06T 5/006; G06T 7/73; G09G 5/37
See application file for complete search history.

(56) References Cited

U.S. PATENT DOCUMENTS

| 9,514,571 B2 | 12/2016 | Williams et al. |
| 10,242,654 B2 | 3/2019 | Ozguner et al. |
| 10,453,175 B2 | 10/2019 | Mierle et al. |
| 10,621,707 B2 | 4/2020 | Dorbie et al. |

(Continued)

FOREIGN PATENT DOCUMENTS

| KR | 10-2019-0015093 A | 2/2019 |
| WO | 2019/212643 A1 | 11/2019 |

OTHER PUBLICATIONS

Jerald, J. (2004). Latency compensation for head-mounted virtual reality. Department of Computer Science, University of North Carolina at Chapel Hill. p. 1-16.*

(Continued)

*Primary Examiner* — Sarah Lhymn
(74) *Attorney, Agent, or Firm* — Sughrue Mion, PLLC

(57) ABSTRACT

A method of correcting image latency in implementing augmented reality includes receiving a first image including frames, in which a time point and a pose of an electronic apparatus for each frame are recorded, from an external apparatus; rendering the first image; receiving first data corresponding to a first time point of a first frame; receiving second data corresponding to a second time point of a second frame; calculating a respective pose of the electronic apparatus for each scan line of a second image based on the first data and the second data; calculating a pixel shift for each pixel in each scan line based on the respective pose calculated for each scan line; generating the second image by correcting the first image based on the pixel shift; and transmitting the second image to the external apparatus.

20 Claims, 12 Drawing Sheets

(56) References Cited

U.S. PATENT DOCUMENTS

| | | | |
|---|---|---|---|
| 11,049,476 | B2* | 6/2021 | Fuchs .................... G09G 5/377 |
| 2015/0029218 | A1 | 1/2015 | Williams et al. |
| 2017/0243324 | A1 | 8/2017 | Mierle et al. |
| 2018/0053284 | A1* | 2/2018 | Rodriguez ............ G06T 3/0093 |
| 2019/0012826 | A1 | 1/2019 | Melkote Krishnaprasad et al. |
| 2019/0045213 | A1 | 2/2019 | Raut et al. |
| 2019/0279427 | A1 | 9/2019 | Tang et al. |
| 2020/0104975 | A1 | 4/2020 | Banerjee et al. |
| 2020/0302682 | A1* | 9/2020 | Aksoy .................. H04N 13/128 |
| 2022/0048199 | A1* | 2/2022 | Heidemann ............ B25J 9/1692 |
| 2022/0103734 | A1* | 3/2022 | Halmetschlager-Funek ................. G06T 7/73 |

OTHER PUBLICATIONS

Jerald, Jason, Andrew Fuller, Anselmo Lastra, Mary Whitton, Luv Kohli, and Fred Brooks. "Latency compensation by horizontal scanline selection for head-mounted displays." In Stereoscopic Displays and Virtual Reality Systems XIV, vol. 6490, pp. 568-578. SPIE, 2007.*

Aga, Hiroyuki, Atsushi Ishihara, Koichi Kawasaki, Mitsuru Nishibe, Shunitsu Kohara, Takuzo Ohara, and Masaki Fukuchi. "24-2: Latency Compensation for Optical See-Through Head-Mounted with Scanned Display." In SID Symposium Digest of Technical Papers, vol. 50, No. 1, pp. 330-333. 2019.*

Kijima et al., "Reflex HMD to Compensate Lag and Correction of Derivative Deformation," IEEE Computer Society, Proceedings of the IEEE Virtual Reality 2002 (VR'02), 2002, Total 8 pages.

Heaney, "VR Timewarp, Spacewarp, Reprojection, and Motion Smoothing Explained," VR (https://uploadvr.com/vr/), Jan. 17, 2019, Total 11 pages.

Regan et al., "An Architecture for Orientation Mapping Post Rendering," 1998, pp. 121-129.

Wagner, "Motion to Photon Latency in Mobile AR and VR," https://medium.com/@DAQRI/motion-to-photon-latency-in-mobile-ar-and-vr-99f82c480926, Aug. 21, 2018, Total 17 pages.

"Timewarp," Virtual Reality and Augmented Reality Wiki, https://xinreality.com/wiki/Timewarp, Jul. 5, 2020, Total 3 pages.

McLellan, "Arm unveils Mali-D77 display processor aimed at VR head-mounted displays," ZDNet, https://www.zdnet.com/article/arm-unveils-mali-d77-display-processor-aimed-at-vr-head-mounted-displays, May 15, 2019, Total 8 pages.

"Asynchronous Spacewarp," Virtual Reality and Augmented Reality Wiki, https://xinreality.com/wiki/Asynchronous_Spacewarp, Nov. 28, 2016, Total 4 pages.

"Projective Camera Model," imatest, Geometric Calibration—deprecated, www.imatest.com/support/docs/pre-5-2/geometric-calibration/projective-camera, Sep. 12, 2019, Total 9 pages.

Van Waveren, "The Asynchronous Time Warp for Virtual Reality on Consumer Hardware," VRST '16, pp. 37-46, Nov. 2016, DOI: http://dx.doi.org/10.1145/2993369.2993375.

* cited by examiner

METHOD OF CORRECTING IMAGE LATENCY AND APPARATUS USING THE SAME

CROSS-REFERENCE TO RELATED APPLICATION

This application is based on and claims priority under 35 U.S.C. § 119 to Korean Patent Application No. 10-2020-0185211, filed on Dec. 28, 2020, in the Korean Intellectual Property Office, the disclosure of which is incorporated by reference herein in its entirety.

BACKGROUND

1. Field

The disclosure relates to methods of correcting image latency and apparatuses using the methods, in implementing augmented reality.

2. Description of Related Art

A technology that implements augmented reality (AR) or virtual reality (VR) and provides the same to a user is being used in various fields. Implementation of augmented reality by reflecting 6 degrees of freedom (6DoF) according to a user's movement is becoming easier with the development of graphic processing technology.

In an apparatus configured in the form of a head mounted display (HMD) or an apparatus configured in a tethered form, such as AR glasses, locations of a graphic processing apparatus may be different. For example, in the form of an HMD, graphic processing may be performed through an electronic circuit of AR glasses, or a graphic processing apparatus of a portable terminal (e.g., a smart phone) mounted on a mount gear may be used. In a tethered form, graphics processing for implementation of augmented reality may be performed using a graphic processing apparatus of an external apparatus connected to AR glasses by wire or wirelessly.

In the form of the HMD of AR or VR, a discrepancy between motion and display may be a major cause of obstructing the user's immersion. A method for image correction may be needed to minimize a time difference between motion and display with motion to photon latency. A method for image latency correction may use a head motion at a time point when a rendered image is displayed.

A technique introduced for the image latency correction may be referred to as timewarping. The timewarping may compensate for image latency by compensating for head orientation before and after rendering. Conventional timewarping may cause an excessive load on a processor due to complicated calculation of reprojection in a 6DoF compensation of the head orientation, and there may be a limit to correction for translation.

SUMMARY

Additional aspects will be set forth in part in the description which follows and, in part, will be apparent from the description, or may be learned by practice of example embodiments of the disclosure.

In accordance with an aspect of the disclosure, an electronic apparatus includes a memory; a communication module; and a processor configured to: receive a first image including a plurality of frames, in which a time point and a pose of the electronic apparatus for each frame of the plurality of frames are recorded, from an external apparatus through the communication module, render the received first image, receive, from the communication module, first data corresponding to a first time point of a first frame of the plurality of frames, receive, from the communication module, second data corresponding to a second time point of a second frame of the plurality of frames, the second time point being different from the first time point, calculate a respective pose of the electronic apparatus for each scan line of a plurality of scan lines of a second image based on the first data and the second data, calculate a pixel shift for each pixel of a plurality of pixels in each scan line based on the respective pose calculated for each scan line, generate the second image by correcting the first image based on the pixel shift, and transmit the second image to the external apparatus through the communication module.

The processor may receive the first data through a time stamp recorded in the memory, or receives the first data from an image processor of the external apparatus through the communication module.

The processor may calculate a difference between the first data and the second data when calculating the respective pose for each scan line.

The processor may calculate the pixel shift for each pixel in each scan line through differentiation based on the difference calculated between the first data and the second data.

The processor may perform distortion compensation based on a display curvature of the external apparatus when generating the second image.

The first data may include data related to the first time point and data related to a first pose of the electronic apparatus at the first time point.

The second data may include data related to the second time point measured through a time stamp of the processor, data related to a second pose of the electronic apparatus at the second time point, and data measured through an inertial measurement unit of the external apparatus.

The difference between the first data and the second data may be related to a position and a posture of the electronic apparatus.

The processor may generate the second image in which the distortion compensation is performed, using a buffer.

The electronic apparatus may be integrally coupled to the external apparatus or communicatively connected to the external apparatus through the communication module.

In accordance with an aspect of the disclosure, a method of correcting image latency for augmented reality includes receiving a first image including a plurality of frames, in which a time point and a pose of an electronic apparatus for each frame of the plurality of frames are recorded, from an external apparatus; rendering the received first image; receiving first data corresponding to a first time point of a first frame of the plurality of frames; receiving second data corresponding to a second time point of a second frame of the plurality of frames, the second time point being different from the first time point; calculating a respective pose of the electronic apparatus for each scan line of a plurality of scan lines of a second image based on the first data and the second data; calculating a pixel shift for each pixel of a plurality of pixels in each scan line based on the respective pose calculated for each scan line; generating the second image by correcting the first image based on the pixel shift; and transmitting the second image to the external apparatus.

The receiving of the first data of the first time point may include receiving the first data through a time stamp recorded in a memory, or receiving the first data from an image processor of the external apparatus.

The calculating of the pose for each scan line may include calculating a difference between the first data and the second data.

The pixel shift for each pixel in each scan line may be calculated through differentiation based on the difference calculated between the first data and the second data.

The generating of the second image further may include performing distortion compensation based on a display curvature of the external apparatus.

The first data may include data related to the first time point and data related to a first pose of the electronic apparatus at the first time point.

The second data may include data related to the second time point measured through a time stamp of a processor, data related to a second pose of the electronic apparatus at the second time point, and data measured through an inertial measurement unit of the external apparatus.

The difference between the first data and the second data may be related to a position and a posture of the electronic apparatus.

The second image in which the distortion compensation is performed may be generated using a buffer.

The electronic apparatus may be integrally coupled to the external apparatus or communicatively connected to the external apparatus.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
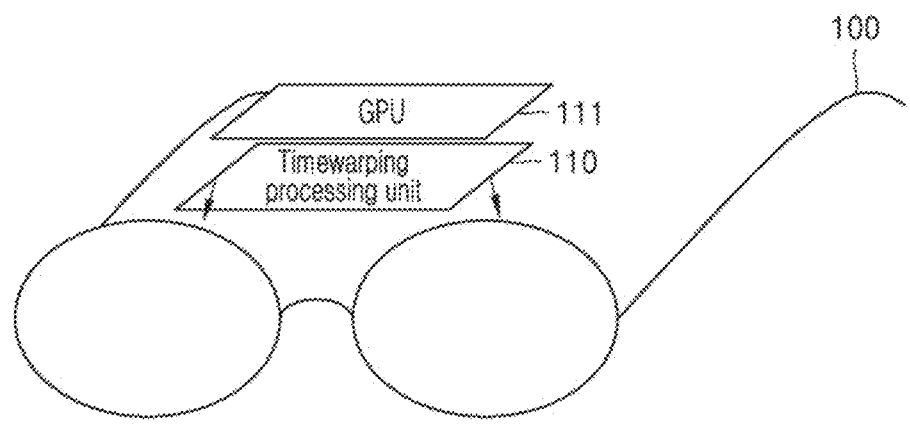
FIGS. 1A and 1B are example diagrams illustrating a connection method of an electronic apparatus according to various embodiments.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As for the terms used in example embodiments, general terms that are currently widely used as possible are selected, but the terms may vary according to an intention of a person skilled in the art, a judicial precedent, or the emergence of new technologies, and the like. In addition, in certain cases, there are terms arbitrarily selected by the applicant, and in this case, the meaning thereof will be described in detail in the corresponding description. Therefore, the terms used in the specification should be defined based on the meaning of the terms and the overall contents throughout the specification, not simple names of the terms.

The terms such as "comprise" or "include" used in example embodiments should not be interpreted as necessarily including all of various components or various steps described in the specification, and the terms may be interpreted that some of the components or some of the steps may not be included, or additional components or steps may further included.

In example embodiments, when it is stated that a component is "connected" to another component, it should be interpreted that this includes not only a case that the component is directly connected to the another component, but also a case that the component is connected to the another component with another apparatus therebetween.

In addition, terms including ordinal numbers such as "first" or "second" used in example embodiments may be used to describe various components, but the components should not be limited by the terms. The terms are used only for the purpose of distinguishing one component from another component.

Hereinafter, example embodiments will be described in detail with reference to the accompanying drawings. However, example embodiments may be implemented in various different forms and are not limited to examples described herein.

Figure 1B:
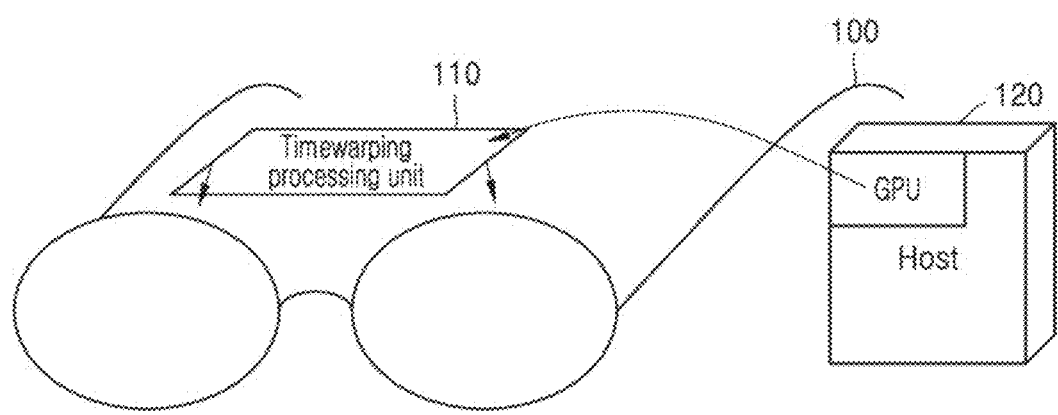

FIGS. 1A and 1B are example diagrams illustrating a connection method of an electronic apparatus according to various embodiments of the disclosure.

Referring to FIG. 1A, an electronic apparatus may be configured to be integrally combined with an AR glass 100. For example, the electronic apparatus may be attached to at least a portion of the AR glass 100 in the form of an electronic circuit, or may be embedded in and coupled to at least the portion of the AR glass 100. The electronic apparatus may be physically and/or electrically connected to a processor of the AR glass 100 at a location close to each other, thereby rapidly processing graphics-related calculations. The graphics-related calculations may include per-pixel processing for images captured through the AR glass 100, graphic processing related to a user's movement of the AR glass 100 and/or the electronic apparatus, or image processing according to directions and movements.

Referring to FIG. 1A, the electronic apparatus may include a timewarping processing unit 110 and a graphic processing unit (GPU) 111. For example, the electronic apparatus may be designed in a field programmable gate array (FPGA) and included in the AR glass 100. The electronic apparatus may be integrally coupled with the AR glass 100 or may be communicatively connected to the AR glass 100 through a communication module.

Referring to FIG. 1B, the electronic apparatus may be communicatively connected to the AR glass 100 through the communication module. For example, the electronic apparatus may be mounted or embedded in a host 120 in a tethered manner to process graphic calculations. What is connected in the tethered manner may be a portable terminal to be mounted by a separate deck or may be a separate server, and a connection method thereof may be wired and/or wireless.

Referring to FIG. 1B, the electronic apparatus may process the graphics-related calculations without integrally coupling with the AR glass 100. For example, the electronic apparatus may render an image received through the AR glass 100 and transmit a rendered result to the AR glass 100. The electronic apparatus may process graphic calculations using a GPU (e.g., the GPU 111 of FIG. 1A), and timewarping may be processed through the timewarping processing unit 110 that may be included in the AR glass 100. For another example, the electronic apparatus may include the timewarping processing unit 110 together with the GPU 111. FIG. 1B shows only an example, and the timewarping processing unit 110 may be included in a part of the host 120 to be a component of the electronic apparatus including the GPU 111.

Figure 2:
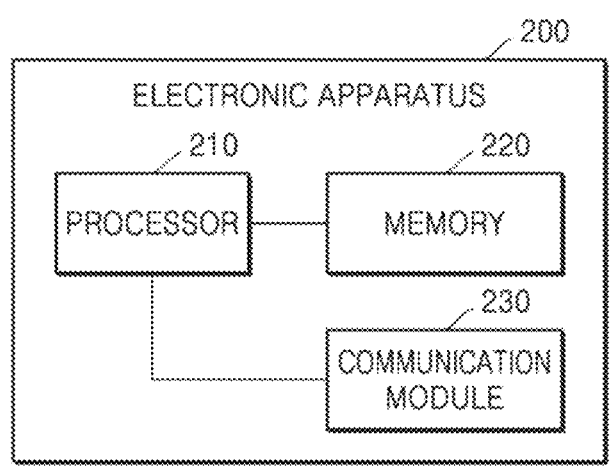
FIG. 2 is a block diagram illustrating components of an electronic apparatus according to various embodiments.

FIG. 2 is a block diagram illustrating components of an electronic apparatus according to various embodiments of the present disclosure.

Referring to FIG. 2, an electronic apparatus 200 may include a processor 210, a memory 220, and a communication module 230. For example, the electronic apparatus 200 may be an apparatus that processes graphic calculations. The electronic apparatus 200 may include a graphic calculation apparatus including a graphic processing unit, and may include an electronic circuit including the GPU. Referring to FIG. 2, the components of the electronic apparatus 200 are only examples and are not limited to the illustrated components, and may be substituted or added with other components.

Referring to FIG. 2, the processor 210 may include the GPU. For example, the processor 210 may perform graphic processing calculation on an image received from an external apparatus communicatively connected to the electronic apparatus 200. The processor 210 may be included as a part of the electronic circuit including the FPGA.

The processor 210 may receive the image in which a time point for each frame is recorded from the external apparatus. For example, the processor 210 may receive the image captured through a camera module by the external apparatus communicatively connected to the electronic apparatus 200. The processor 210 may receive the image and determine a shooting time point of a corresponding frame. The processor 210 may determine the shooting time point of the image received, by using a separate time stamp or by receiving the shooting time point from an image processor of the external apparatus.

The processor 210 may render the image received. For example, after receiving a 2D image, the processor 210 may render the 2D image into a 3D image based on various data included in the image. The processor 210 may perform graphic processing for shadow, color, and density, or the like, based on the data. The processor 210 may render the image received and thus receive a first data of a rendered time point (e.g., a first time point) from the communication module 230. For example, the processor 210 may be connected to an AR glass (e.g., the AR glass 100 of FIG. 1B) in the tethered manner. The processor 210 may render the image received from the AR glass and receive the first data, which is additional data, from the AR glass through the communication module 230. The processor 210 may obtain data (e.g., $t_r$) related to the rendered time point (e.g., the first time point) of the image received by using the time stamp that is measured by the electronic apparatus 200. For example, the processor 210 may obtain data related to an exact time at which rendering is performed, as data related to the time point at which rendering is performed. For another example, the processor 210 may be integrally coupled with the AR glass to receive first data of the rendered time point through the communication module 230. When rendering is performed after receiving the image, the processor 210 may receive data related to the rendered time point and the first data at the rendered time point, by the time stamp through a processor of the AR glass and/or an image processor. The first data may include data related to the rendered time point and data (e.g., $Pose_r$) related to a pose of the electronic apparatus at the rendered time point.

The processor 210 may receive second data of the electronic apparatus 200 at a second time point different from the rendered time point (e.g., the first time point). For example, the processor 210 may be connected to the AR glass in the tethered manner. The processor 210 may receive the second data at the second time point. The second data may include data (e.g., $t_c$) related to the second time point measured through the time stamp of the processor 210, data (e.g., $Pose_c$) related to the pose of the electronic apparatus 200 at the second time point, and data (e.g., $t_{IMU}$, $acc_{IMU}$, $w_{IMU}$) measured through an inertial measurement unit (IMU) of the external apparatus. For example, the data (e.g., $t_c$) related to the second time point and the data (e.g., $Pose_c$) related to the pose of the electronic apparatus 200 at the second time point may mean data related to the time point at which the processor 210 performs image correction and the pose of the electronic apparatus 200 in a corresponding time point. In detail, the data measured through the IMU may be different from a time of the second time point. The time point at which data is measured through the IMU of the external apparatus may be different from the time point at which data (e.g., $Pose_c$) related to the pose of the electronic apparatus is received. Data (e.g., $t_c$) related to the second time point may be the same as data (e.g., $t_{IMU}$) related to a time point of measurement of the data measured through the IMU.

The IMU may include, for example, a 3-axis acceleration sensor and a 3-axis gyro sensor, and may output data acquired through each of the sensors. Specifically, the IMU may measure the inertia by acquiring position data through acceleration measured through the 3-axis acceleration sensor and orientation data through an angular velocity measured through the 3-axis gyro sensor.

The processor 210 may calculate the pose for each scanline based on the first data and the second data. The processor 210 may calculate the pose based on data (e.g., $t_r$) related to the rendered time point (e.g., the first time point), data (e.g., $Pose_r$) related to the pose at the rendered time point, data (e.g., $t_c$) related to the time point (e.g., the second time point) for performing image correction, data (e.g., $Pose_c$) related to the pose at the time point for performing image correction, and data (e.g., $t_{IMU}$, $acc_{IMU}$, $w_{IMU}$) measured through the IMU of the external apparatus. For example, the processor 210 may calculate the pose for each scan line by using an individual row as a line in a matrix composed of the first data and the second data. Image latency may occur because the rendered time point and a time point to be displayed are different and the pose is different according to each individual time point. The processor 210 may perform calculation to correct such image latency. The processor 210 may calculate the pose differently by reflecting differently latency for each scan line. A difference between the poses calculated by the processor 210 may be stored in a buffer, and may be stored for each scan line in which 6DoF change amount is calculated. The calculation for each scan line performed by the processor 210 and data stored in the buffer may be in a table format, and the calculation may be calculated according to Equations (1) to (5) and the data may be stored as shown in Table 1.

Equation $$t_{scanline} = t_{disp} + \alpha v \quad (1)$$

$$t_{scanline} = t_{disp} + av \quad (1)$$

$$\Delta Position = \frac{t_{scanline} - t_r}{t_c - t_r}(Position_c - Position_r) \quad (2)$$

$$\Delta orientation = \frac{t_{scanline} - t_r}{t_c - t_r} < (R_c R_r^{-1}) \quad (3)$$

$$\Delta Position = \quad (4)$$

$$\frac{t_{scanline} - t_r}{t_c - t_r}(Position_c - Position_r) + \sum_{t_i - t_c}^{t_{i+1} = t_{scanline}}\left(\frac{1}{2}\left(\vec{a} - \vec{g}\right)(t_{i+1} - t_i)^2\right)$$

$$\Delta orientation = \sum_{t_i - t_c}^{t_{i+1} = t_{scanline}} \left(\vec{w}(t_{IMU} - t_c)\right) \quad (5)$$

TABLE 1

| v1 | $\Delta x_1$ | $\Delta y_1$ | $\Delta z_1$ | $\Delta \theta x_1$ | $\Delta \theta y_1$ | $\Delta \theta z_1$ |
|---|---|---|---|---|---|---|
| v2 | $\Delta x_2$ | $\Delta y_2$ | $\Delta z_2$ | $\Delta \theta x_2$ | $\Delta \theta y_2$ | $\Delta \theta z_2$ |
| v3 | $\Delta x_3$ | $\Delta y_3$ | $\Delta z_3$ | $\Delta \theta x_3$ | $\Delta \theta y_3$ | $\Delta \theta z_3$ |
| v4 | $\Delta x_4$ | $\Delta y_4$ | $\Delta z_4$ | $\Delta \theta x_4$ | $\Delta \theta y_4$ | $\Delta \theta z_4$ |

In Equation (1), $t_{disp}$ may mean data related to the time point when the rendered image is displayed, or data related to the time point at which image latency correction of the processor 210 is performed. In Equation (1), $\alpha$ may mean a model in which a time delay linearly increases according to v. Equations (2) and (3) may mean a pose calculation based on extrapolation. Equation (4) and Equation (5) may mean the pose calculation including IMU integration. Positions in Equations (2) to (5) may mean locations thereof, and orientations may mean directions thereof. Results calculated according to Equations (1) to (5) may be stored in the table format as shown in Table 1 and, or may be stored in the buffer or in a separate memory 220. X, y, and z values written in Table 1 may mean coordinates of individual axes of three axes, and $\Delta$ may mean difference. $\theta$ may represent data related to rotation in three axes, and w, a, and g may be calculated or obtained based on data measured through the IMU. It may be sufficiently understood by those of ordinary skill in the art that w, a, and g may mean angular velocity, acceleration, and gravitational acceleration, respectively. Vn in Table 1 may mean an individual row, and in this specification, Vn may correspond to an individual scan line on which the processor 210 performs a calculation. In an apparatus that implements augmented reality by wearing the AR glass, time differences between sensing and displaying of the image at individual time points of the IMU, a camera, a tracker, and a renderer may occur. For expressing the above, the term of motion to photon latency may be used. In order to solve latency in image display, the GPU may perform correction and may involve the image latency correction. The correction performed by the GPU may be a kind of timewarping, and reprojection may be performed together. The reprojection may mean a method of calculating a corresponding point of each pixel according to change in the pose, through projection from 2D to 3D and again from 3D to 2D. For another example, the GPU may perform image shift together. The image shift may be calculating a shift of each pixel according to the change in the pose.

In this specification, a graphic processing calculation that reflects the time difference between the time point rendered and the time point displayed on a display, and reflects a change in 6DoF due to the user's movement and image processing may be described. For example, image shift modeling by 6DoF of the motion of the user's head moving while wearing the AR glass, and compensation and correction for each line scan by rendering latency may be described.

Figure 3:
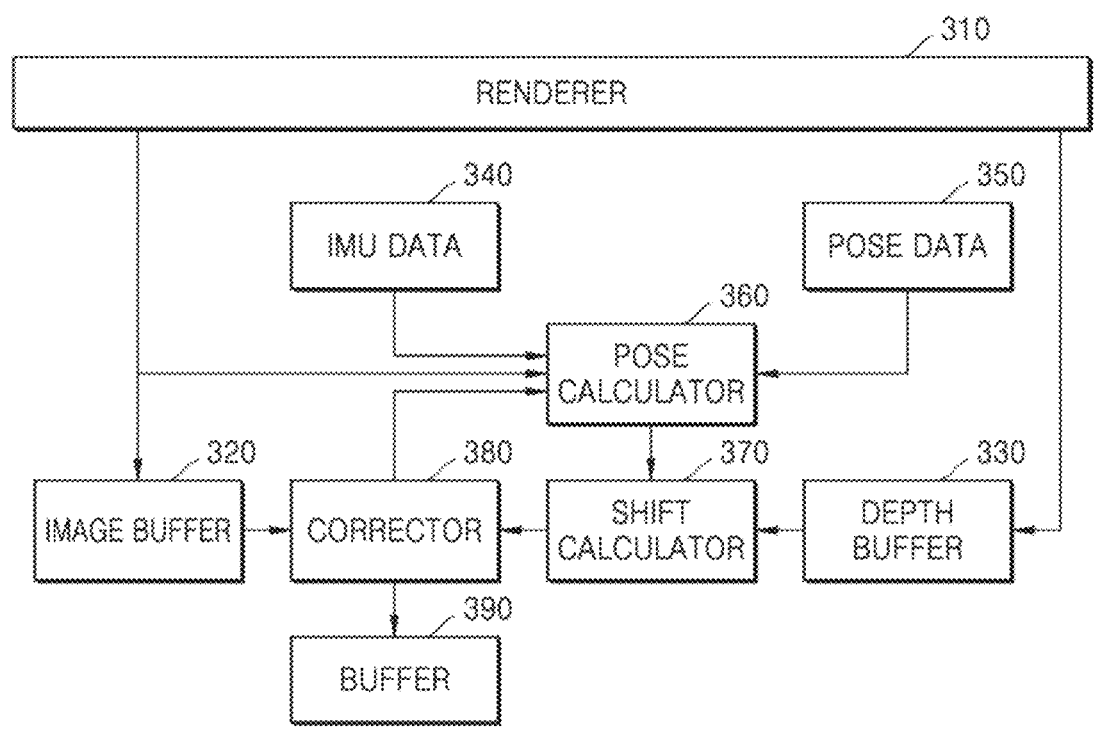
FIG. 3 is an example diagram illustrating a block configuration according to performing of a function of a method of correcting image latency according to various embodiments.

FIG. 3 is an example diagram illustrating a block configuration according to performing a function of a method of correcting image latency according to various embodiments.

FIG. 3 may correspond to an example illustrating the method of correcting image latency that is performed by the processor (e.g., the processor 210 of FIG. 2) of the electronic apparatus (e.g., the electronic apparatus 200 of FIG. 2) according to individual function. For example, the processor may receive the image and perform rendering, which may mean performing a function of a renderer 310. The renderer 310 may mean a software, or may mean that the processor executes the renderer 310 to perform the function thereof. The renderer 310 may store a rendered image (e.g., the first image) in an image buffer 320 and also may transmit data (e.g., $t_r$) related to a rendered time point (e.g., the first time point) and data (e.g., Pose$_r$) related to a pose of an electronic apparatus at the rendered time point to a pose calculator 360.

Referring to FIG. 3, the image buffer 320 may store a result of image rendering to be performed through the processor. For example, the image buffer 320 may store the rendered image (e.g., the first image) of an image received by the electronic apparatus and store a corrected image (e.g., a second image) of the image rendered through the processor. The image buffer 320 may be included in a memory (e.g., the memory 230 of FIG. 2).

Referring to FIG. 3, a depth buffer 330 may store a depth value of the rendered image. For example, the depth buffer 330 may store depth values of u and v coordinates in pixels of the rendered image. The depth buffer 330 may be included in the memory. The depth buffer 330 may transmit the depth value Pz to a shift calculator 370.

Referring to FIG. 3, IMU data 340 may include data (e.g., $t_{IMU}$, acc$_{IMU}$, w$_{IMU}$) measured through the IMU of the external apparatus. The IMU data 340 may be transmitted to a pose calculator 360.

Referring to FIG. 3, pose data 350 may include data (e.g., $t_c$) related to a time point (e.g., the second time point) at which image correction is performed, and data (e.g., Pose$_c$) related to the pose at the time point at which image correction is performed. The pose data 350 may be transmitted to the pose calculator 360.

Referring to FIG. 3, the pose calculator 360 may calculate the pose for each scan line based on the first data and the second data. The pose calculator 360 may calculate the pose based on data (e.g., $t_r$) related to the rendered time point (e.g., the first time point), data (e.g., Pose$_r$) related to the pose at the rendered time point, data (e.g., $t_c$) related to a time point (e.g., the second time point) for performing image correction, data (e.g., Pose$_c$) related to the pose at the time point for performing image correction, and data (e.g., $t_{IMU}$, $acc_{IMU}$, $w_{IMU}$) measured through the IMU of the external apparatus. For example, the pose calculator 360 may calculate the pose for each scan line by using an individual row as a line in a matrix composed of the first data and the second data. The image latency may occur because the rendered time point and the displayed time point are different and the pose is different for each individual time point. The pose calculator 360 may perform calculation to correct such image latency. The pose calculator 360 may calculate poses differently by reflecting differently latency for each scan line. The difference between the poses calculated by the pose calculator 360 may be stored in the buffer, and may be stored for each scan line in which 6DoF change amount is calculated. The calculation for each scan line performed through the pose calculator 360 and data stored in the buffer may be stored in table format. A result of the table format calculated through the pose calculator 360 may be data related to 6DoF and for example, the result may be displayed as $\Delta x_1$, $\Delta y_1$, $\Delta z_1$, $\Delta\theta x_1$, $\Delta\theta y_1$, $\Delta\theta z_1$ and may be represented as a difference value. The result of the table format may be stored in the pose buffer and transmitted to the shift calculator 370.

Referring to FIG. 3, the shift calculator 370 may calculate $\Delta u$, $\Delta v$ on u and v coordinates for compensating for a pose difference at the time point to be displayed for each scan line and transmit a calculated result to the shift buffer. For example, the shift calculator 370 may perform shift calculation such as Equation (6) below based on the result of the fourth scan line in Table 1.

Equation $$\begin{bmatrix} \Delta u \\ \Delta v \end{bmatrix} = \begin{vmatrix} \frac{f_u}{P_z}\Delta x = \frac{u-c_x}{P_z}\Delta z - \frac{(u-c_x)(v-c_y)}{f_v}\Delta\theta_x + \\ f_u\left(1 + \frac{(u-c_x)^2}{f_u^2}\right)\Delta\theta_y - f_u\frac{v-c_y}{f_v}\Delta\theta_z \\ \frac{f_v}{P_z}\Delta y = \frac{v-c_y}{P_z}\Delta z - f_v\left(1 + \frac{(v-c_y)^2}{f_v^2}\right)\Delta\theta_x + \\ \frac{(u-c_x)(v-c_y)}{f_u}\Delta\theta_y + f_v\frac{u-c_x}{f_u}\Delta\theta_z \end{vmatrix} \quad (6)$$

In Equation (6), data related to c (e.g., $c_x$, $c_y$, $c_z$) may correspond to experimental values as a kind of constant. In addition, Pz of the depth buffer 330 may be used as a representative depth value and may be equally applied to all pixels. The shift calculator 370 may perform reprojection by calculating a pixel shift. Data (e.g., $f_u$, $f_v$) related to f in Equation (6) may be values derived from differentiation for u and v. This may be explained in Equations (7) to (12).

Equation $$\begin{bmatrix} u \\ v \end{bmatrix} = \begin{bmatrix} f_u\frac{P_x}{P_z} + c_x \\ f_v\frac{P_y}{P_z} + c_y \end{bmatrix} \quad (7)$$

$$\begin{bmatrix} P_x \\ P_y \\ P_z \end{bmatrix} = R\begin{bmatrix} P_x \\ P_y \\ P_z \end{bmatrix}_{t=t_0} + \begin{bmatrix} t_x \\ t_y \\ t_z \end{bmatrix} \quad (8)$$

$$\begin{bmatrix} du \\ dv \end{bmatrix} =$$

$$\begin{vmatrix} \frac{\partial u}{\partial P_x} & \frac{\partial u}{\partial P_y} & \frac{\partial u}{\partial P_z} \\ \frac{\partial v}{\partial P_x} & \frac{\partial v}{\partial P_y} & \frac{\partial v}{\partial P_z} \end{vmatrix} \begin{vmatrix} \frac{\partial P_x}{\partial t_x} & \frac{\partial P_x}{\partial t_y} & \frac{\partial P_x}{\partial t_z} & \frac{\partial P_x}{\partial \theta_x} & \frac{\partial P_x}{\partial \theta_y} & \frac{\partial P_x}{\partial \theta_z} \\ \frac{\partial P_y}{\partial t_x} & \frac{\partial P_y}{\partial t_y} & \frac{\partial P_y}{\partial t_z} & \frac{\partial P_y}{\partial \theta_x} & \frac{\partial P_y}{\partial \theta_y} & \frac{\partial P_y}{\partial \theta_z} \\ \frac{\partial P_z}{\partial t_x} & \frac{\partial P_z}{\partial t_y} & \frac{\partial P_z}{\partial t_z} & \frac{\partial P_z}{\partial \theta_x} & \frac{\partial P_z}{\partial \theta_y} & \frac{\partial P_z}{\partial \theta_z} \end{vmatrix} \begin{vmatrix} dt_x \\ dt_y \\ dt_z \\ d\theta_x \\ d\theta_y \\ d\theta_z \end{vmatrix} \quad (9)$$

$$\begin{vmatrix} \frac{\partial u}{\partial P_x} & \frac{\partial u}{\partial P_y} & \frac{\partial u}{\partial P_z} \\ \frac{\partial v}{\partial P_x} & \frac{\partial v}{\partial P_y} & \frac{\partial v}{\partial P_z} \end{vmatrix} = \begin{bmatrix} \frac{f_u}{P_z} & 0 & -f_u\frac{P_x}{P_z^2} \\ 0 & \frac{f_v}{P_z} & -f_v\frac{P_y}{P_z^2} \end{bmatrix} \quad (10)$$

$$\begin{vmatrix} \frac{\partial P_x}{\partial t_x} & \frac{\partial P_x}{\partial t_y} & \frac{\partial P_x}{\partial t_z} \\ \frac{\partial P_y}{\partial t_x} & \frac{\partial P_y}{\partial t_y} & \frac{\partial P_y}{\partial t_z} \\ \frac{\partial P_z}{\partial t_x} & \frac{\partial P_z}{\partial t_y} & \frac{\partial P_z}{\partial t_z} \end{vmatrix} = \begin{vmatrix} 1 & 0 & 0 \\ 0 & 1 & 0 \\ 0 & 0 & 1 \end{vmatrix} \quad (11)$$

$$\begin{vmatrix} \frac{\partial P_x}{\partial \theta_x} & \frac{\partial P_x}{\partial \theta_y} & \frac{\partial P_x}{\partial \theta_z} \\ \frac{\partial P_y}{\partial \theta_x} & \frac{\partial P_y}{\partial \theta_y} & \frac{\partial P_y}{\partial \theta_z} \\ \frac{\partial P_z}{\partial \theta_x} & \frac{\partial P_z}{\partial \theta_y} & \frac{\partial P_z}{\partial \theta_z} \end{vmatrix} = \begin{vmatrix} 0 & P_z & -P_y \\ -P_z & 0 & P_x \\ P_y & -P_x & 0 \end{vmatrix} \quad (12)$$

Referring to FIG. 3, a corrector 380 may generate an image (e.g., the second image) obtained by correcting a rendered image (e.g., the first image). The corrector 380 may transmit data corresponding to $t_{disp}$, which may mean data corresponding to a time when the rendered image is displayed or data corresponding to the time point at which the image latency correction of the processor is performed, to the pose calculator 360. The corrector 380 may generate the image buffer in consideration of the pixel shift. The image buffer may be generated from an input buffer and use the buffer of 3 stacks of n and x image widths. A corrected image buffer may use the buffer of 2 stacks of n and x image widths and may alternately fill images of two buffers. Here, n may be determined as a maximum value of $\Delta v$ that may be generated by motion.

Referring to FIG. 3, a buffer 390 may store the image (e.g., the second image) corrected by the corrector 380. The buffer 390 may be included in the memory.

Figure 4:
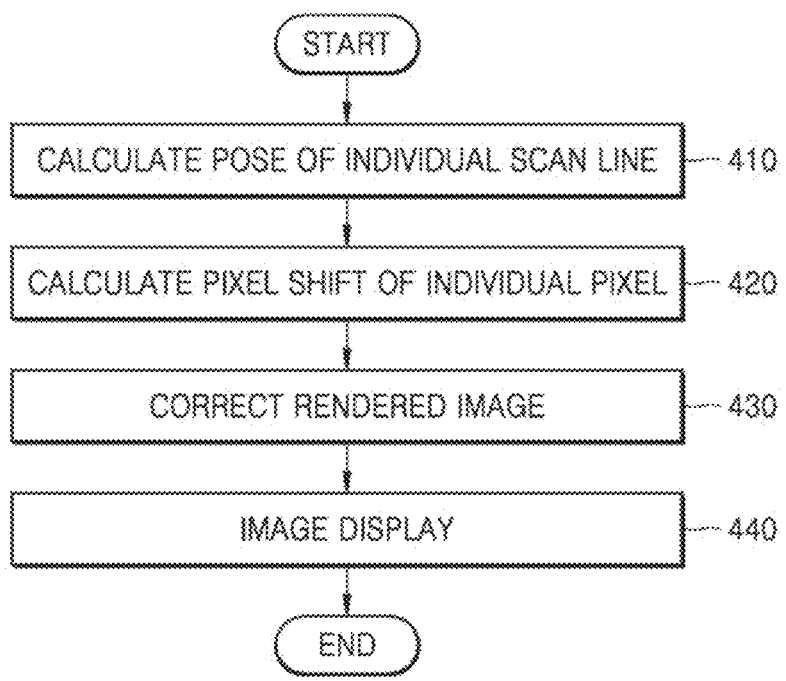
FIG. 4 is a flowchart illustrating a method of correcting image latency according to various embodiments.

FIG. 4 is a flowchart illustrating a method of correcting image latency according to various embodiments.

Referring to FIG. 4, in step 410, the processor (e.g., the processor 210 of FIG. 2) may calculate the pose of an individual scan line. The processor may calculate the pixel shift of an individual pixel in step 420. The processor may correct the rendered image in step 430. The processor may transmit the corrected image to the external apparatus for display in step 440.

Figure 5:
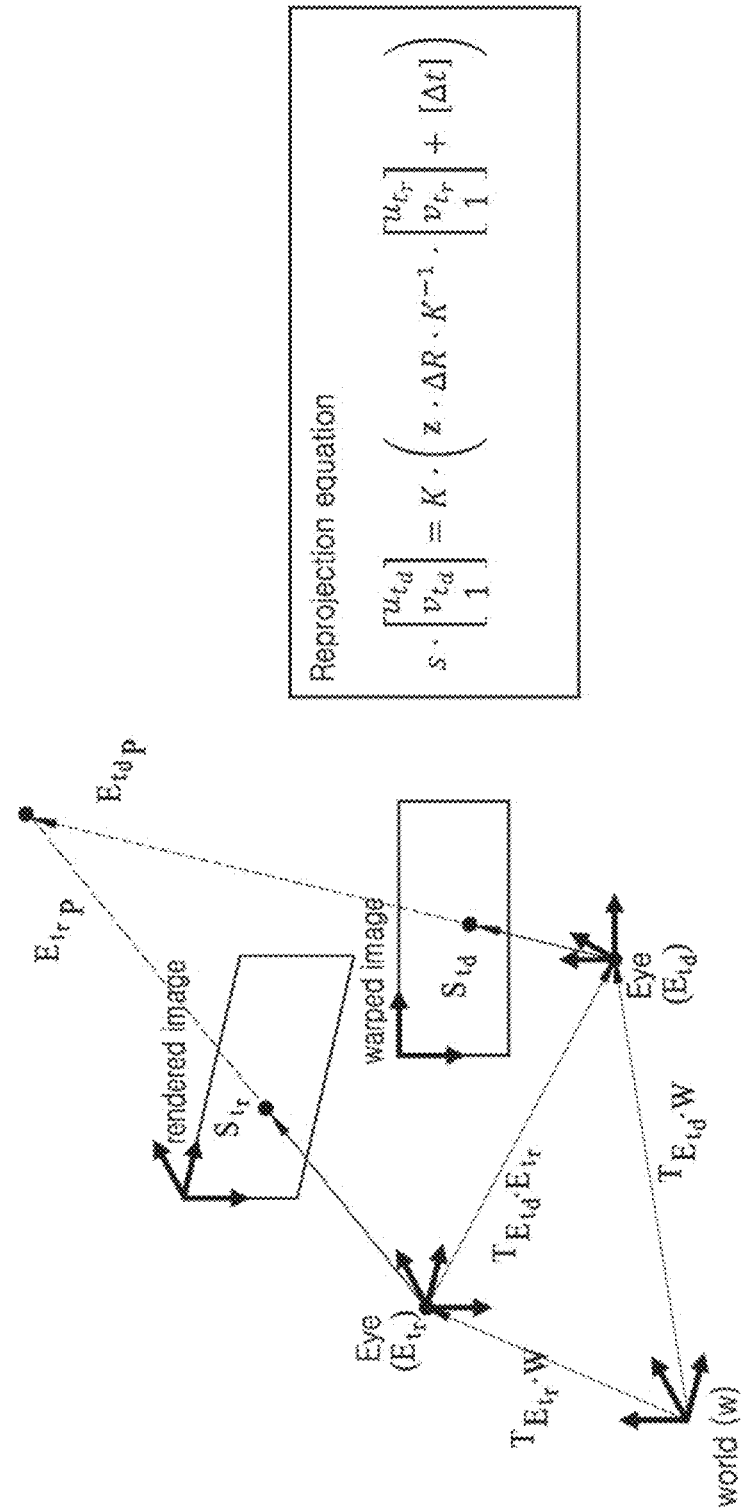
FIG. 5 is an example diagram illustrating a reprojection calculation of a method of correcting image latency according to various embodiments.

FIG. 5 is an example diagram illustrating reprojection calculation of a method of correcting image latency according to various embodiments.

Referring to FIG. 5, image timewarping may be performed from data (e.g., $t_r$) related to the rendered time point (e.g., the first time point) to data related to the displayed time point (e.g., $t_d$). Here, a change in the pose related to the user's eyes of the AR glass (e.g., the AR glass 100 of FIG. 1A) may be represented by $$T_{E_{t_d} \cdot E_{t_r}} = [\Delta R \mid \Delta t].$$

=[ΔR|Δt]. 2D coordinates in the rendered image may be represented as $S_{t_r}$, and 2D coordinates in the time warped image may be represented as $S_{t_d}$. Referring to FIG. 5, K may mean a display intrinsic matrix.

Referring to FIG. 5, the world coordinates of $S_{t_r}$ may be expressed as $E_{t_r}P$. This may be expressed by matrix calculation such as Equation (13) below.

Equation $$\begin{bmatrix} X_{t_r} \\ Y_{t_r} \\ Z_{t_r} \end{bmatrix} = Z_{t_r} \cdot K^{-1} \cdot \begin{bmatrix} u_{t_r} \\ v_{t_r} \\ 1 \end{bmatrix} \quad (13)$$

Referring to FIG. 5, world coordinates of the user's eyes at the displayed time point may be expressed as $E_{t_d}P$. This may be expressed by the matrix calculation as shown in Equation (14) below.

Equation $$\begin{bmatrix} X_{t_d} \\ Y_{t_d} \\ Z_{t_d} \end{bmatrix} = T_{E_{t_d} \cdot E_{t_r}} \begin{bmatrix} X_{t_r} \\ Y_{t_r} \\ Z_{t_r} \\ 1 \end{bmatrix} = \Delta R \cdot d \cdot K^{-1} \cdot \begin{bmatrix} u_{t_r} \\ v_{t_r} \\ 1 \end{bmatrix} + [\Delta t] \quad (14)$$

Referring to FIG. 5, coordinates projected on a screen (e.g., the glass of the AR glass 100 of FIG. 1) at the displayed time point may be expressed by calculation of Equation (15) below.

Equation $$s \cdot \begin{bmatrix} u_{t_d} \\ v_{t_d} \\ 1 \end{bmatrix} = K \cdot \left( z \cdot \Delta R \cdot K^{-1} \cdot \begin{bmatrix} u_{t_r} \\ v_{t_r} \\ 1 \end{bmatrix} + [\Delta t] \right) \quad (15)$$

Referring to Equation (15), a matrix on the left side may be a matrix representing time-warped coordinates. K on the right side may mean the display intrinsic matrix, or a projection matrix. The z on the right side may indicate a distance, and ΔR and Δt may indicate changes in the poses in the user's eyes (e.g., R is rotation and t is translation). The matrix on the right side may mean rendered coordinates.

FIG. 5 is only an example for an equation for performing timewarping, and the equation may be derived by various methods.

Figure 6A:
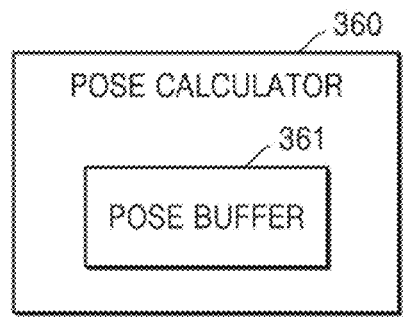
FIGS. 6A and 6B are example diagrams illustrating a pose calculation of a method of correcting image latency according to various embodiments.
Figure 6B:
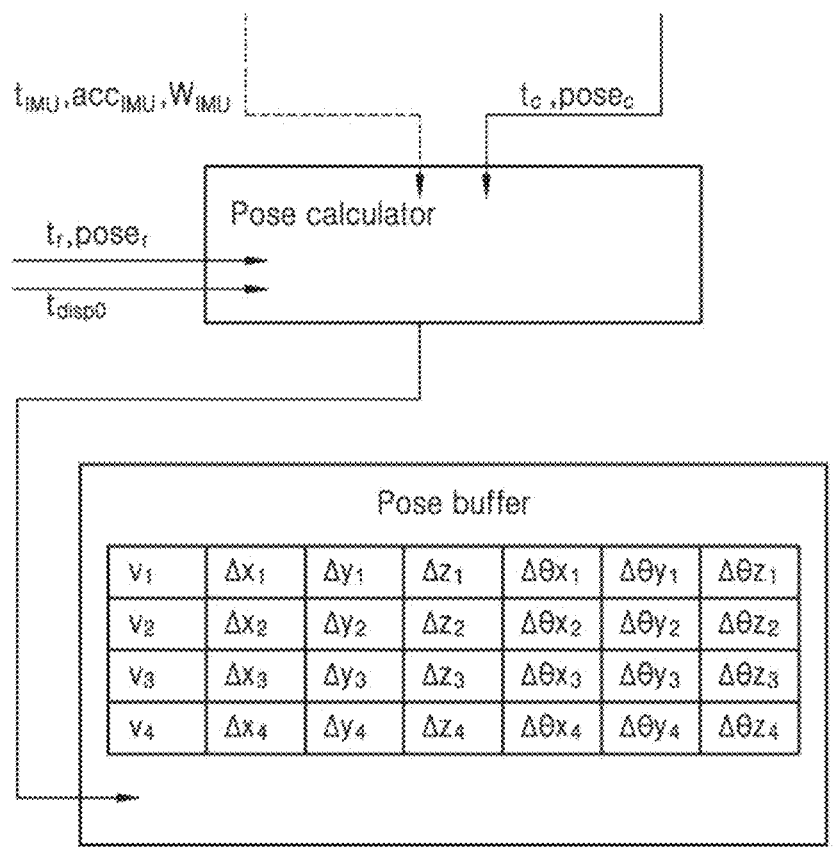

FIGS. 6A and 6B are example diagrams illustrating a pose calculation of a method of correcting image latency according to various embodiments.

FIGS. 6A and 6B may correspond to an example of a pose calculator 360 and a pose buffer 361 that perform a function of the processor (e.g., the processor 210 of FIG. 2) related to pose calculation. For example, the pose calculator 360 may perform a function of the processor that calculates the pose based on the first data and the second data. The pose buffer 361 may store data of pose calculation.

Referring to FIG. 6B, the pose calculator 360 may calculate the pose for each scan line based on the first data and the second data. The pose calculator 360 may calculate the pose based on data (e.g., $t_r$) related to the rendered time point (e.g., the first time point), data (e.g., Pose$_r$) related to the pose at the rendered time point, data (e.g., $t_c$) related to the time point (e.g., the second time point) for performing image correction, data (e.g., Pose$_c$) related to the pose at the time point for performing image correction, and data (e.g., $t_{IMU}$, acc$_{IMU}$, w$_{IMU}$) measured through the IMU of the external apparatus. For example, the pose calculator 360 may calculate the pose for each scan line by using the individual row as the line in the matrix composed of the first data and the second data. The image latency may occur because the rendered time point and the displayed time point are different and the pose is different according to each individual time point. The pose calculator 360 may perform calculation to correct such image latency. The pose calculator 360 may calculate poses differently by reflecting differently latency for each scan line. The difference between the poses calculated by the pose calculator 360 may be stored in the buffer, and may be stored for each scan line in which 6DoF change amount is calculated. The calculation for each scan line performed through the pose calculator 360 and data stored in the buffer may be in table format. The result of the table format calculated through the pose calculator 360 may be data related to 6DoF and for example, the result may be displayed as $\Delta x_1, \Delta y_1, \Delta z_1, \Delta \theta x_1, \Delta \theta y_1, \Delta \theta z_1$ and may be represented as a difference. The result of the table format may be stored in the pose buffer and transmitted to the shift calculator.

Figure 7A:
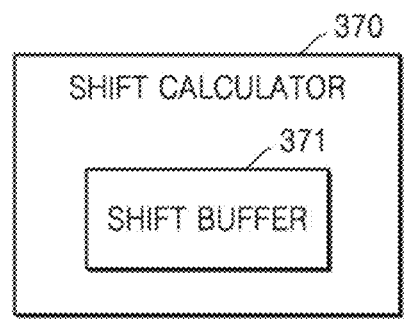
FIGS. 7A and 7B are example diagrams illustrating a shift calculation for each pixel in a method of correcting image latency according to various embodiments.
Figure 7B:
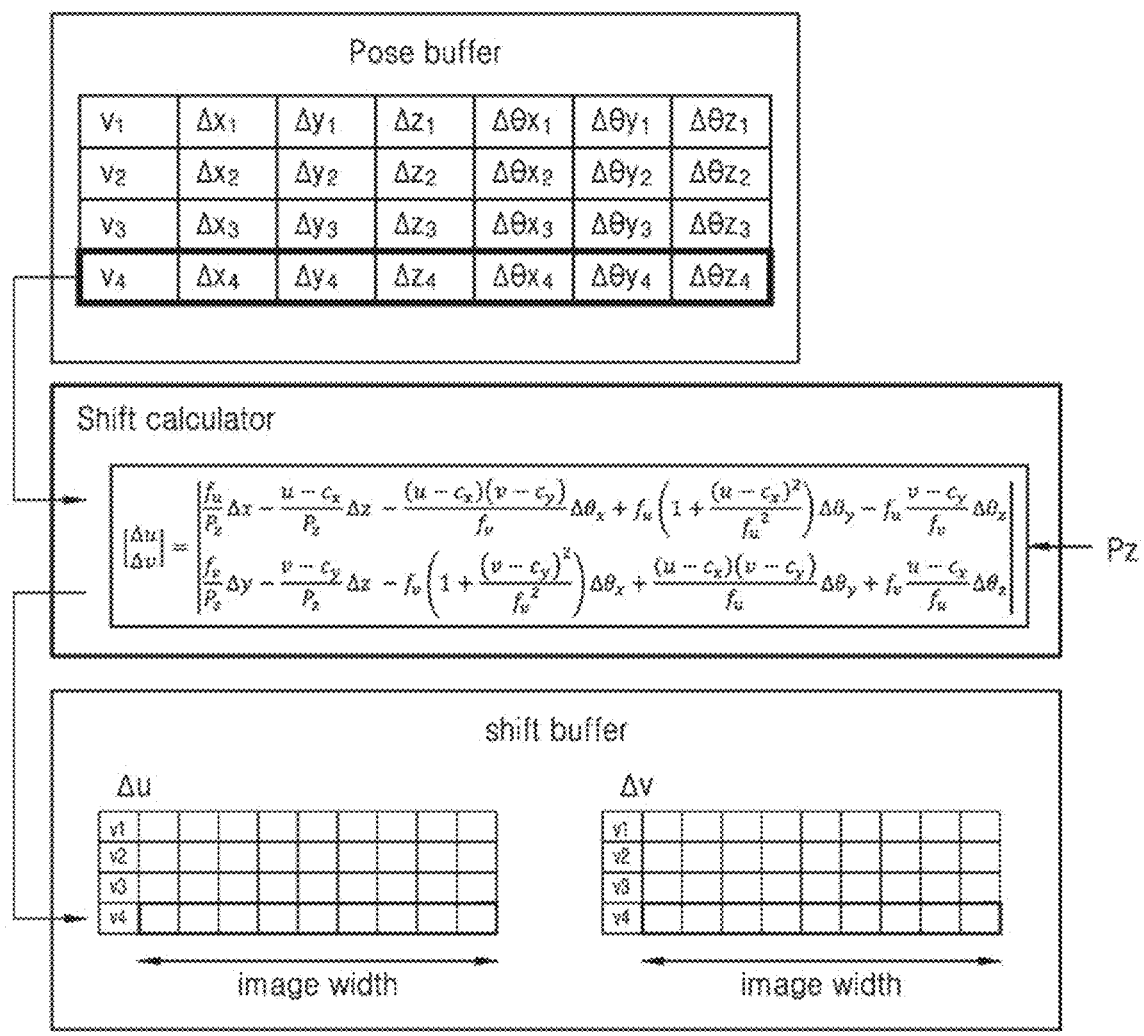

FIGS. 7A and 7B are example diagrams illustrating shift calculation for each pixel in a method of correcting image latency according to various embodiments.

FIGS. 7A and 7B may correspond to an example of the shift calculator 370 and the shift buffer 371 that perform a function of the processor (e.g., the processor 210 of FIG. 2) related to shift calculation. For example, the shift calculator 370 may perform a function of calculating the pixel shift for each scan line based on the pose for each scan line calculated by the processor. The shift buffer 371 may store a result value of the pixel shift calculation. For another example, the shift calculator 370 may perform a function of calculating the pixel shift for each pixel in the scan line based on the pose for each scan line calculated by the processor and based on the depth of each pixel. For another example, the shift calculator 370 may perform a function of calculating the pixel shift for each pixel in the scan line based on the pose for each scan line calculated by the processor and based on a representative depth value.

The shift calculator 370 may calculate Δu, Δv on u and v coordinates for compensating for the pose difference at the time point to be displayed for each scan line and transmit the result calculated to the shift buffer. For example, the shift calculator 370 may perform the shift calculation such as Equations (6) to (12) above based on the result of the fourth scan line in Table 1.

Figure 8A:
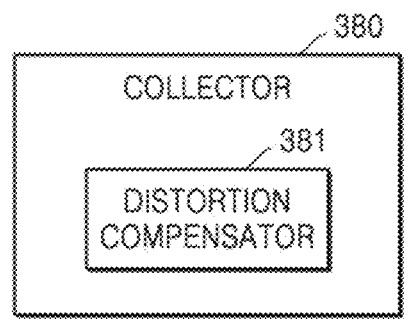
FIGS. 8A and 8B are example diagrams illustrating distortion compensation and image correction according to an external apparatus display, in a method of correcting image latency according to various embodiments.
Figure 8B:
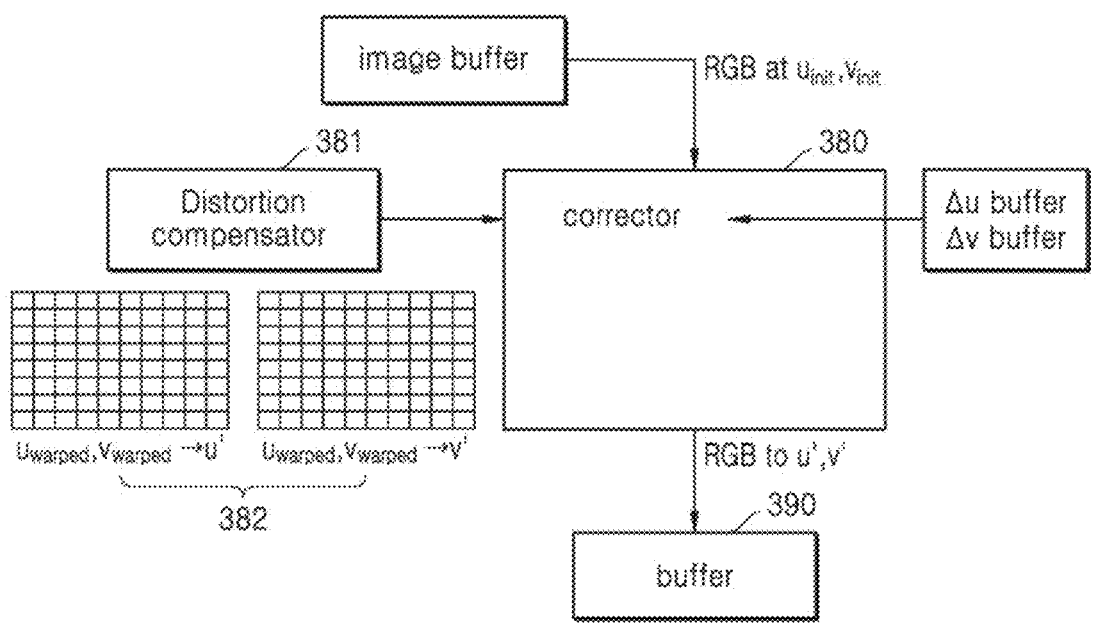

FIGS. 8A and 8B are example diagrams illustrating distortion compensation and image correction according to a display of an external apparatus in a method of correcting image latency according to various embodiments.

FIGS. 8A and 8B may correspond to an example of a corrector 380 and a distortion compensator 381 that perform a function of the processor (e.g., the processor 210 of FIG. 2) related to image latency correction. For example, the corrector 380 may perform a function of generating the corrected image (e.g., the second image) by correcting the rendered image (e.g., the first image) according to the pixel shift calculated by the processor. The distortion compensator 381 may perform a function of compensating for distortion caused by a curvature of the display (e.g., the glass of the AR glass) of the external apparatus when generating the corrected image.

The corrector 380 may generate the image (e.g., the second image) obtained by correcting the rendered image (e.g., the first image). The corrector 380 may transmit data related to $t_{disp}$, which may mean data related to the time when the rendered image is displayed or data related to the time point at which the image latency correction of the processor is performed, to the pose calculator 360. The corrector 380 may generate the image buffer in consideration of the pixel shift. The image buffer may be generated from an input buffer and use buffers of 3 stacks of n and x image widths. A corrected image buffer may use buffers of 2 stacks of n and x image widths and may alternately fill images of two buffers. Here, n may be determined as a maximum value of Δv that may be generated by motion.

The distortion compensator 381 may receive data of $u_{init}$ and $v_{init}$ from the image buffer (e.g., the image buffer 320 of FIG. 3). The distortion compensator 381 may compensate for the occurrence of distortion due to AV/VR optics. Distortion compensation may be applied after timewarping is performed. Integration of timewarping and distortion compensation may be performed in a block in which timewarping is performed through the distortion compensator 381. When distortion compensation is performed, image correction latency may be minimized, and buffer capacity and usage may be minimized. Equations (16) to (18) below may describe functions of the timewarping and distortion compensation of the distortion compensator 381.

Equation $$u_{warped} = u_{init} + \Delta u \quad (16)$$

$$v_{warped} = v_{init} + \Delta v \quad (17)$$

$$(u_{warped}, v_{warped}) \rightarrow (u', v') \quad (18)$$

Equations (16) and (17) may describe that timewarping is performed. The $u_{warped}$ may be a coordinate of u used for timewarping, $v_{warped}$ may be a coordinate of v used for timewarping, $u_{init}$ may be a coordinate of a first u, and $v_{init}$ may be a coordinate of a first v. Equation (18) may describe a function of distortion compensation for converting timewarped coordinates 382 into u' and v' (see, e.g., FIG. 8B). In this way, the calculated values of u' and v' after timewarping and distortion compensation of the distortion compensator 381 are performed may be transmitted to the buffer 390.

The electronic apparatus may include the memory, the communication module, and the processor, wherein the processor may be set to receive a first image in which time points and poses for each frame are recorded from the external apparatus, receive first data at the first time point from the communication module by rendering the first image received, receive second data at a second time point different from the first time point, calculate a pose for each scan line based on the first data and the second data, calculate a pixel shift for each pixel in the scan line based on the pose calculated for each scan line, generate a second image by correcting the first image rendered according to the pixel shift, and transmit the second image to the external apparatus through the communication module.

The processor may receive data related to the first time point through the time stamp recorded in the memory or from an image processor of the external apparatus through the communication module.

When calculating the pose for each scan line, the processor may calculate the difference between the first data and the second data.

The processor may calculate the pixel shift for each scan line through differentiation based on the calculated difference between the first data and the second data.

When generating the second image, the processor may perform distortion compensation on a display curvature of the external apparatus.

The first data may include data related to the first time point and data related to the pose of the electronic apparatus at the first time point. The second data may include data related to the second time point measured through the time stamp of the processor, data related to the pose of the electronic apparatus at the second time point, and data measured through the IMU of the external apparatus. The difference between the first data and the second data may be data related to the position and posture of the electronic apparatus.

The processor may generate the second image in which the distortion compensation is performed, using the buffer. The electronic apparatus may be integrally coupled with the external apparatus or may be communicatively connected through the communication module.

A method of correcting image latency for augmented reality may include steps of receiving a first image in which time points and poses for each frame are recorded from an external apparatus, receiving first data of a first time point from a communication module by rendering the first image received, receiving second data at a second time point different from the first time point, calculating a pose for each scan line based on the first data and the second data, calculating a pixel shift for each pixel in the scan line based on the pose calculated for each the scan line, generating a second image by correcting the first image rendered according to the pixel shift, and transmitting the second image to the external apparatus through a communication module.

The method of correcting image latency for augmented reality may include a step of receiving data related to the first time point through the time stamp recorded in the memory, or receiving the data from an image processor of the external apparatus through the communication module.

The calculating the pose for each scan line may include calculating the difference between the first data and the second data.

The method of correcting image latency for augmented reality may further include a step of calculating the pixel shift for each scan line through differentiation based on the difference calculated between the first data and second data.

The generating the second image may further include performing distortion compensation based on the display curvature of the external apparatus.

The first data may include data related to the first time point and data related to the pose of the electronic apparatus at the first time point. The second data may include data related to the second time point measured through the time stamp of the processor, data related to the pose of the electronic apparatus at the second time point, and data measured through the IMU of the external apparatus. The difference between the first data and the second data may be data related to the position and posture of the electronic apparatus.

The method of correcting image latency for augmented reality may include a step of generating a second image in which the distortion compensation is performed, using the buffer. An electronic apparatus for the method of correcting image latency for augmented reality may be integrated with the external apparatus or communicated through the communication module.

In an example embodiment, a method of correcting image latency for augmented reality may include steps of receiving a first image and a depth buffer in which time points and poses for each frame are recorded from an external apparatus, receiving first data at a first time point from a communication module by rendering the first image received, receiving second data at a second time point different from the first time point, calculating a pose for each scan line based on the first data and the second data, calculating a pixel shift for each pixel in the scan line based on the pose calculated for each scan line and a depth of each pixel, generating a second image by correcting the first image rendered according to the pixel shift, and transmitting the second image to the external apparatus through a communication module.

In an example embodiment, a method of correcting image latency for augmented reality may include steps of receiving a first image and a representative depth value in which time points and poses for each frame are recorded from an external apparatus, receiving first data at a first time point from a communication module by rendering the first image received, receiving second data at a second time point different from the first time point, calculating a pose for each scan line based on the first data and the second data, calculating a pixel shift for each pixel in the scan line based on the pose calculated for each scan line and the representative depth value, generating a second image by correcting the first image rendered according to the pixel shift, and transmitting the second image to the external apparatus through a communication module.

Those of ordinary skill in the art related to embodiments will understand that embodiments may be implemented in a modified form without departing from the essential characteristics of the above-described description. Therefore, embodiments should be considered from an illustrative point of view rather than a limiting point of view. The scope of the rights is shown in the claims rather than the above description, and all differences within the scope equivalent thereto should be construed as being included in embodiments.

The method of correcting image latency may reduce a calculation process through differentiation using the difference between 6DoF-related data in performing reprojection. Through calculation in a short time between the time point for rendering after receiving the image and the motion of moving the head mounted apparatus, the load on the processor may be reduced and simultaneously the correction for the movement may be performed.

The latency according to the difference between the rendering time point and the displayed time point on the head mounted apparatus may be applied to the scan for each row of individual image frame. For example, the latency may be corrected for each scan line by modeling the display time of the scan line or by modeling the change in the pose when an individual scan line is displayed.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic apparatus comprising:
a memory;
a communication module; and
a processor configured to:
receive a first image comprising a plurality of frames, in which a time point and a pose of the electronic apparatus for each frame of the plurality of frames are recorded, from an external apparatus through the communication module,
render the received first image,
receive, from the communication module, first data corresponding to a first time point of a first frame of the plurality of frames,
receive, from the communication module, second data corresponding to a second time point of a second frame of the plurality of frames, the second time point being different from the first time point,
calculate a respective pose of the electronic apparatus for each scan line of a plurality of scan lines of a second image based on the first data and the second data,
calculate a pixel shift for each pixel of a plurality of pixels in each scan line based on the respective pose calculated for each scan line,
generate the second image by correcting the first image based on the pixel shift, and
transmit the second image to the external apparatus through the communication module.

2. The electronic apparatus of claim 1, wherein the processor receives the first data through a time stamp recorded in the memory, or receives the first data from an image processor of the external apparatus through the communication module.

3. The electronic apparatus of claim 1, wherein the processor calculates a difference between the first data and the second data when calculating the respective pose for each scan line.

4. The electronic apparatus of claim 3, wherein the processor calculates the pixel shift for each pixel in each scan line through differentiation based on the difference calculated between the first data and the second data.

5. The electronic apparatus of claim 3, wherein the difference between the first data and the second data is related to a position and a posture of the electronic apparatus.

6. The electronic apparatus of claim 1, wherein the processor performs distortion compensation based on a display curvature of the external apparatus when generating the second image.

7. The electronic apparatus of claim 6, wherein the processor generates the second image in which the distortion compensation is performed, using a buffer.

8. The electronic apparatus of claim 1, wherein the first data comprises data related to the first time point and data related to a first pose of the electronic apparatus at the first time point.

9. The electronic apparatus of claim 1, wherein the second data comprises data related to the second time point measured through a time stamp of the processor, data related to a second pose of the electronic apparatus at the second time point, and data measured through an inertial measurement unit of the external apparatus.

10. The electronic apparatus of claim 1, wherein the electronic apparatus is integrally coupled to the external apparatus or communicatively connected to the external apparatus through the communication module.

11. A method of correcting image latency for augmented reality, the method comprising:
receiving a first image comprising a plurality of frames, in which a time point and a pose of an electronic apparatus for each frame of the plurality of frames are recorded, from an external apparatus;

rendering the received first image;

receiving first data corresponding to a first time point of a first frame of the plurality of frames;

receiving second data corresponding to a second time point of a second frame of the plurality of frames, the second time point being different from the first time point;

calculating a respective pose of the electronic apparatus for each scan line of a plurality of scan lines of a second image based on the first data and the second data;

calculating a pixel shift for each pixel of a plurality of pixels in each scan line based on the respective pose calculated for each scan line;

generating the second image by correcting the first image based on the pixel shift; and transmitting the second image to the external apparatus.

12. The method of correcting image latency of claim 11, wherein the receiving of the first data of the first time point comprises receiving the first data through a time stamp recorded in a memory, or receiving the first data from an image processor of the external apparatus.

13. The method of correcting image latency of claim 11, wherein the calculating of the pose for each scan line comprises calculating a difference between the first data and the second data.

14. The method of correcting image latency of claim 13, wherein the pixel shift for each pixel in each scan line is calculated through differentiation based on the difference calculated between the first data and the second data.

15. The method of correcting image latency of claim 13, wherein the difference between the first data and the second data is related to a position and a posture of the electronic apparatus.

16. The method of correcting image latency of claim 11, wherein the generating of the second image further comprises performing distortion compensation based on a display curvature of the external apparatus.

17. The method of correcting image latency of claim 16, wherein the second image in which the distortion compensation is performed is generated using a buffer.

18. The method of correcting image latency of claim 11, wherein the first data comprises data related to the first time point and data related to a first pose of the electronic apparatus at the first time point.

19. The method of correcting image latency of claim 11, wherein the second data comprises data related to the second time point measured through a time stamp of a processor, data related to a second pose of the electronic apparatus at the second time point, and data measured through an inertial measurement unit of the external apparatus.

20. The method of correcting image latency of claim 11, wherein the electronic apparatus is integrally coupled to the external apparatus or communicatively connected to the external apparatus.

* * * * *